July 11, 1967   F. A. DE PUYDT ETAL   3,330,563
INFLATABLE SEAL STRUCTURE
Filed July 15, 1965                     2 Sheets-Sheet 1
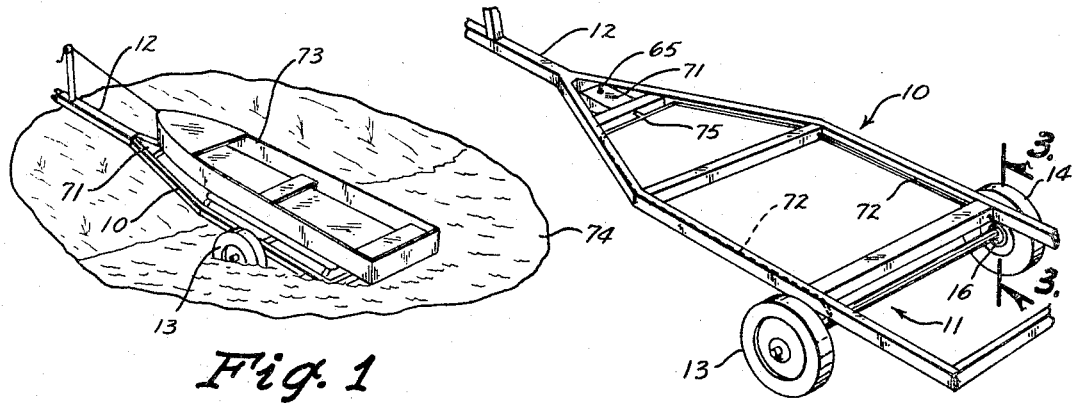
Fig. 1
Fig. 2
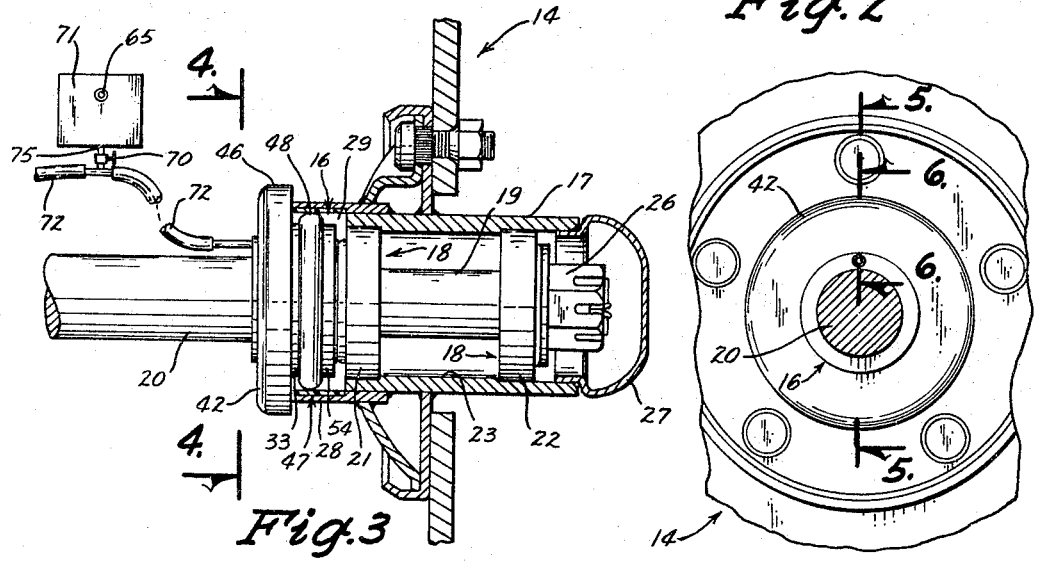
Fig. 3
Fig. 4
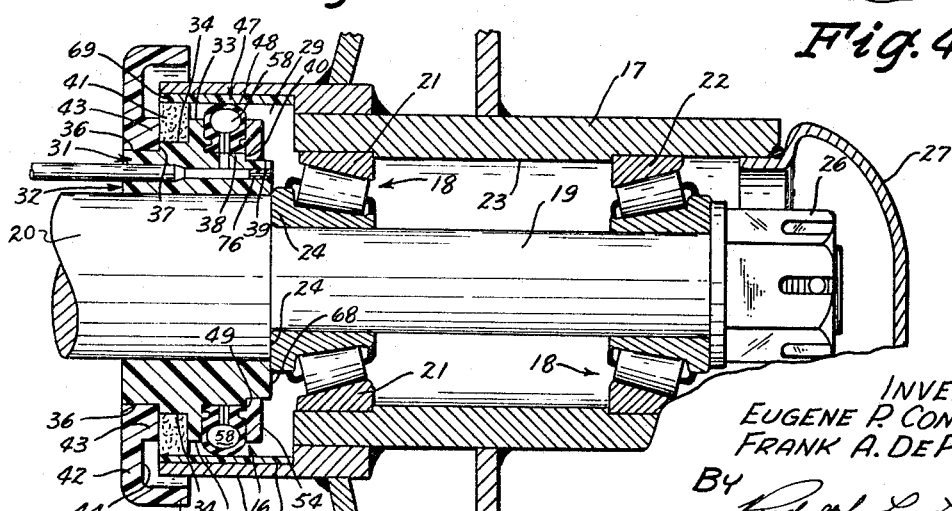
Fig. 5
INVENTORS
EUGENE P. CONRADI
FRANK A. DE PUYDT
BY
Rudolph L. Lowell
ATTORNEY July 11, 1967   F. A. DE PUYDT ETAL   3,330,563
INFLATABLE SEAL STRUCTURE
Filed July 15, 1965   2 Sheets-Sheet 2
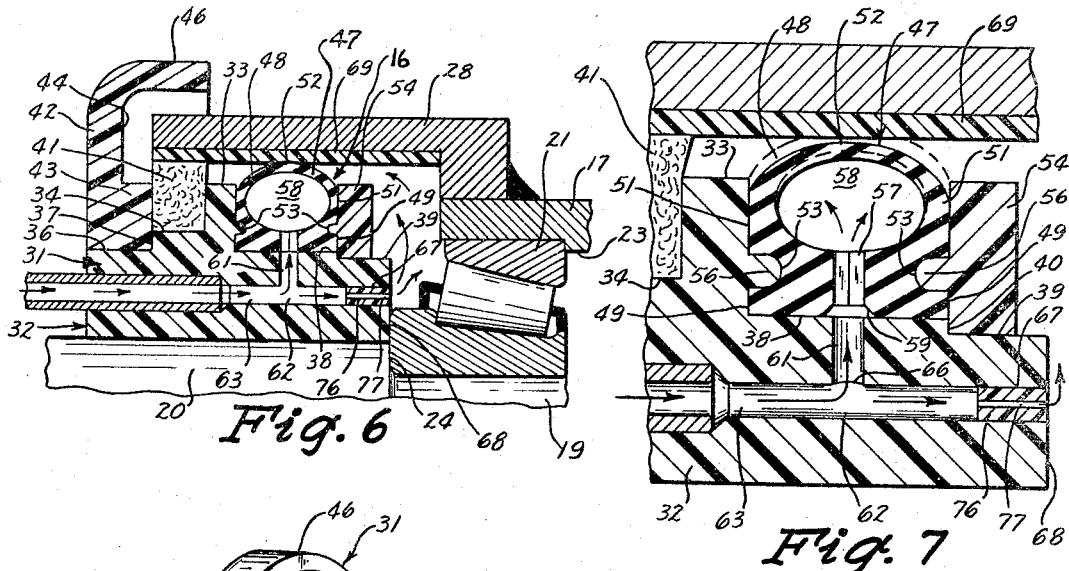
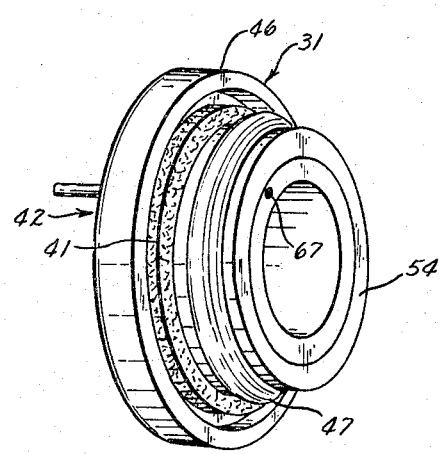
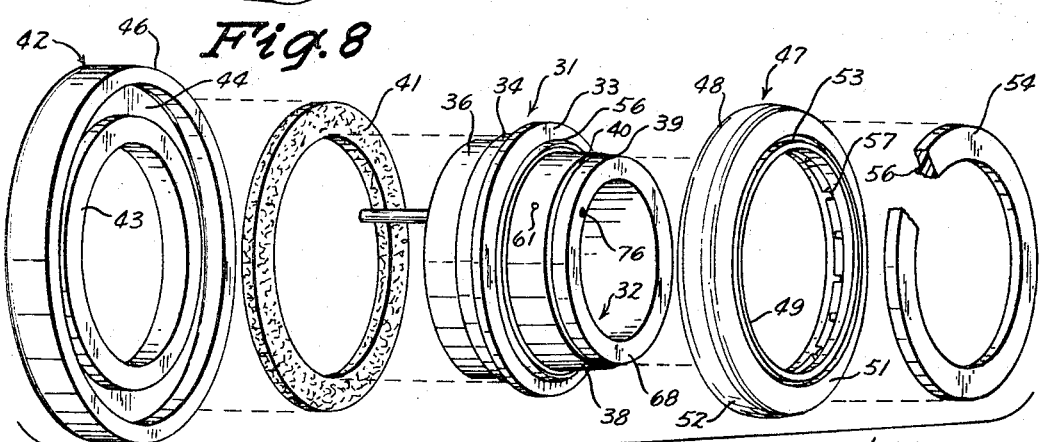
INVENTORS
EUGENE P. CONRADI
FRANK A. DePUYDT
BY
ATTORNEY United States Patent Office 3,330,563
Patented July 11, 1967

3,330,563
INFLATABLE SEAL STRUCTURE
Frank A. De Puydt and Eugene P. Conradi, Des Moines, Iowa, assignors to Dico Corporation, Des Moines, Iowa, a corporation of Iowa
Filed July 15, 1965, Ser. No. 472,277
8 Claims. (Cl. 277—29)

This invention relates generally to wheel bearing seals and in particular to an inflatable fluid seal structure for the bearing assembly of a wheel unit of a boat trailer.

In the launching of a boat from a trailer special care must be exercised to keep water and dirt from entering the bearing assemblies of the trailer wheels. These bearing assemblies generally are without any water sealing structures so that the trailer cannot be backed into a lake or river a distance greater than the water depth to the wheel axle. Since this depth limitation leaves the boat in "dry dock" on the trailer appreciable effort is required and inconvenience encountered in manually manipulating the boat for launching. Because of this effort and inconvenience the care of the wheel bearing assemblies is overlooked and the trailer is often backed into the water to a depth sufficient to float the boat therefrom. The reverse procedure is followed in loading the boat.

Some trailers are equipped with a boat frame which is tiltable relative to the trailer wheel assembly in the loading and unloading of the boat. This type of trailer still requires keeping the wheel bearings out of the water but it does appreciably reduce the effort otherwise required with a fixed boat frame.

It is an object of this invention therefore to provide an improved fluid seal structure for the wheel bearing of a boat trailer.

A further object of this invention is to provide a fluid seal structure for the inboard end of the wheel bearing assembly of a boat trailer wherein an inflatable sealing member is movable into a fluid sealing position when the bearing is to be submerged and movable out of a fluid sealing position when the bearing is to be open to the atmosphere.

Another object of this invention is to provide a fluid seal structure for the wheel bearing assembly of a boat trailer which permits the bearing assembly to be submerged so that a boat can be floated from and onto the trailer and wherein the fluid seal may be released or broken for road travel of the trailer.

Still a further object of this invention is to provide an inflatable seal structure for the inboard end of a wheel bearing which is of a simple and compact structure and efficient in operation for prolonged service periods with a minimum of maintenance and care.

Further objects, features and advantages of this invention will become apparent from the following description when taken in connection with the accompanying drawing wherein:

FIG. 1 is a perspective view of a boat in assembly relation with a trailer embodying the fluid seal structure of this invention;

FIG. 2 is an enlarged perspective view of the trailer of FIG. 1;

FIG. 3 is an enlarged sectional detail view taken along the line 3—3 in FIG. 2;

FIG. 4 is a sectional view as seen along the line 4—4 in FIG. 3;

FIGS. 5 and 6 are sectional detail views taken along the lines 5—5 and 6—6, respectively, in FIG. 4;

FIG. 7 is an enlarged sectional detail showing of an annular inflatable member which forms part of the fluid seal structure of the invention;

FIG. 8 is a perspective view of a collar unit which is embodied in the fluid seal structure of this invention; and FIG. 9 is an exploded perspective view of the collar unit shown in FIG. 8.

With reference to the drawing there is shown in FIG. 2 a boat trailer having a frame 10 carried on a wheel and axle assembly 11 and provided with a tongue structure 12. The wheel units 13 and 14 of the assembly 11 are equipped at their inboard ends with a fluid seal structure of this invention indicated generally at 16 for the wheel unit 14. Since the wheel units 13 and 14 are similar in construction only the wheel unit 14 will be described in detail.

The wheel unit 14 (FIGS. 3 and 5) includes a tubular hub 17 rotatably supported on a bearing assembly 18 mounted on a reduced end section 19 of the shaft 20 of the wheel and axle assembly 11. The bearing assembly 18 is illustrated as being comprised of a pair of axially spaced bearing units 21 and 22 arranged to opposite sides of a shoulder section 23 formed on the inner peripheral surface of the hub section 17. The inboard bearing unit 21 is engageable with a shoulder 24 formed at the junction of the main section of the shaft 20 with its reduced end section 19 so that on clamping of a nut 26, which is threadable on the free end of the section 19, against the bearing unit 22 the wheel unit 14 is rotatably mounted on the shaft against axial movement. A cap member 27 closes and fluid seals the outboard end of the hub 17.

Secured to the inboard end of the hub 17 (FIG. 3) is a hub extension 28 of an enlarged diameter relative to the hub 17 so as to form a cavity or pocket 29 inwardly of the bearing assembly 18 for receiving the fluid seal structure 16. In other words the fluid seal structure 16 is mounted on the shaft 20 within the hub extension 28 at a position adjacent the bearing unit 21.

The structure 16 (FIGS. 5 and 6) includes a collar unit 31 formed of a plastic material having a hub 32 with an outer peripheral surface of an irregular contour. Intermediate its ends the hub 32 has a radially extended annular flange or wall 33. To one side of the flange 33 are annular steps 34 and 36 joined by a shoulder 37 while to the opposite side of the flange 33 there are steps 38 and 39 joined by a shoulder 40.

Mounted on the step 34 and against the flange 33 is a dust seal 41 of ring type. A guard or shield 42, which may be of a plastic material, has a hub 43 frictionally mounted on the step 36 with one end against the shoulder 37. The inboard end of the hub 43 is integrally formed with a radially extended annular wall 44 terminating in an inturned flange 46 which, when the collar unit 31 is mounted on the shaft 20, overlaps the inboard end of the hub extension 28 in a concentrically spaced relation.

An inflatable annular sealing member 47 of a rubber material is mounted about the step 38. The construction of the sealing member 47 is substantially that of a miniature tubeless tire having a casing 48 formed with beads 49, side walls 51 and a tread or outer peripheral surface 52 (FIG. 7). Corresponding side walls 51 and beads 49 have their outer surfaces in a common plane so that the opposite sides of the casing 48 are flat over a radial length substantially coextensive with the radial length of the flange 33. The junctions of the beads 49 with the side walls 51 are defined by annular grooves 53. The tread section 52 is of a generally arcuate contour and projects outwardly from the flange 33.

A flat holding ring 54 mounted about the step 39 has a radial length equal to the radial length of the flange 33 so that when one side of the ring 54 abuts against the shoulder 40 there is formed an annular groove about the hub 32 of a depth to receive therein the beads 49 and side walls 51 of the inflatable casing 48. The side walls of this groove are formed with oppositely arranged beads 56 adapted to fit within the annular grooves 53 of the casing 48.

The inner adjacent abutting sides of the beads 49 and part of the side walls 51 (FIGS. 7 and 9) have circumferentially spaced notches 57 to form fluid passages for connecting the annular fluid chamber 58 of the inflatable seal member 47 with the inner peripheral surface of the casing 48. This surface, as best appears in FIG. 7, is formed at the outer ends of the notches or passages 57 with a circumferential groove 59 having flared side walls diverging outwardly away from each other. The groove 59 is open to a radially extended passage 61 formed in the hub 32 of the collar unit 31 at the step 38. The inner end of the passage 61 is open to a fluid passage 62 which extends in an axial direction through the hub 32 so as to have a single inlet 63 and a pair of outlets 66 and 67 open to the casing chamber 58 and to the atmosphere, respectively.

When the collar unit 31 is assembled (FIGS. 6 and 8) the hub 43 of the guard or shield 42, the flange 33 and the holding ring 54 are generated about equal radii relative to the axis of the shaft 20 so as to be of a constant diameter. However, the dust ring 41 and the inflatable seal member 47 project substantially equal distances outwardly from a peripheral surface which would be defined by such a constant diameter.

In the assembly of the inflatable seal structure 16 with the wheel and axle assembly 11 the collar unit 31 is fitted about the shaft 20 to a position wherein the end 68 of the hub 32 is flush with or in the plane of the shaft shoulder 24 (FIGS. 5 and 6). The wheel unit 14 and its bearing assembly 18 are then mounted about the reduced shaft portion 19 until the bearing unit 21 is in abutting engagement with the shoulder 24 and the hub 32. In this position of the collar unit 31 the hub extension 28 is concentrically spaced about the fluid seal structure 16 with its free end within and in a clearance relation with the inturned terminal end 46 of the shield 42. This relation is maintained by the clamping of the nut 26 against the outboard end of the bearing assembly 18.

The inner peripheral surface of the hub extension 28 is lined with a plastic material illustrated as a tubular sleeve or liner 69 fitted within the hub extension (FIGS. 6 and 7). The dust ring 41 has its outer peripheral surface in engagement with the inner peripheral surface of the sleeve 69 at a position adjacent the free or inboard end of the hub extension 28 whereby to seal the inboard end of the bearing assembly 18 from grit, dirt and the like.

The tread or outer peripheral surface 52 of the inflatable seal member 47 is closely adjacent the inner peripheral surface of the liner 69 when the member 47 is deflated and may be in contact or touching engagement. On inflation of the casing 48 by admission of fluid under pressure through the interconnected passages 62, 61 and 57 into the chamber 58, the tread 52 is moved into frictional bearing engagement with the liner 69 to form therewith a fluid seal for the inboard end of the bearing assembly 18.

Fluid such as air under a pressure of about two to five pounds per square inch may be supplied from a tank 71 (FIGS. 1 and 2) mounted at the front end of the trailer frame 10. Air is supplied to the tank at a valved inlet 65, with the release of air being controlled by a valve 70 in the tank outlet 75 (FIG. 3). Feeder lines 72 connected to the tank outlet 75 supply the air under pressure to the inlet ends of the axial passages 63 formed in the hub members 32.

In use therefore when a boat 73 (FIG. 1) carried on the trailer 10 is to be unloaded from the trailer fluid under pressure from the tank 71 is admitted by means of the control valve 70 through the feeder lines 72, and passages 62, 61 and 57 into the chamber 58 whereby to inflate the sealing member 47 and move the tread 52 into frictional bearing engagement with the inner peripheral surface of the liner 69. This frictional engagement between the tread 52 and liner 69 forms a fluid seal at the inboard end of the bearing assembly 18. The trailer is then moved into the water indicated at 74 to a depth providing for the floating therefrom of the boat 73 after which the unloaded trailer is pulled from the water. It will be noted that during this movement of the trailer the liner 69 is rotated relative to but in frictional engagement with the tread 52 so as to continuously maintain a fluid seal engagement therewith. When the boat 73 is loaded and the trailer 10 hooked up for road travel fluid under pressure is released from the chamber 58 so as to remove the the frictional engagement of the tread 52 with the liner 69.

In some instances it may be desirable to place the complete bearing assembly 18 under a fluid pressure. For this purpose the outlet 67 of the axial extended passage 62 may be provided with a plug 76 having a small diameter discharge orifice 77 extended axially therethrough. Fluid under pressure is thus continuously supplied to the chamber 58 of the inflatable seal member 47 and through the orifice 77 into what might be termed a wheel hub chamber 80 (FIGS. 3 and 5) defined by the hub 17, the extension 28, the fluid seal structure 16 and the cap member 27. Thus with the wheel and axle assembly 11 submerged any water tending to leak around the cap member 27 and into the bearing assembly 18 would be expelled or rejected by the greater pressure of the fluid within the hub chamber 80.

Although the invention has been described with respect to preferred embodiments thereof it is to be understood that it is not to be so limited since changes can be made therein which are within the full intended scope of this invention as defined by the appended claims.

We claim:

1. An inflatable seal structure for the inboard end of a wheel hub assembly which is rotatably supported on a shaft by a bearing located within the hub, said structure comprising:
    (a) a collar unit mounted on said shaft at the inboard end of said hub assembly in a concentrically spaced relation with the inner peripheral surface of the inboard end of the hub assembly,
    (b) an annular inflatable sealing member mounted about said collar unit having an outer peripheral surface movable into frictional engagement with the inner peripheral surface of said wheel hub assembly when said sealing member is inflated, and
    (c) interconnected fluid passage means in said sealing member and collar unit connectable with a source of fluid under pressure.

2. An inflatable seal structure for the inboard end of of a wheel hub assembly which is rotatably supported on a shaft by a bearing located within the hub assembly and wherein the inner peripheral surface of the hub assembly at the inboard end thereof is in a concentrically spaced relation with the shaft, said seal structure comprising:
    (a) a collar unit mounted on said shaft within the inboard end of the hub assembly and including an inflatable peripheral member movable into and out of frictional engagement with the adjacent portion of the inner peripheral surface of said hub assembly,
    (b) fluid passage means in the collar unit having an inlet and an outlet fluid connected with such inflatable member, and
    (c) means for supplying fluid under pressure to said inlet to inflate said inflatable member into frictional bearing engagement with said adjacent portion of the inner peripheral surface of the hub assembly.

3. An inflatable seal structure for the inboard end of a wheel hub assembly which is rotatably supported on a shaft by a bearing member located within the hub assembly, said seal structure comprising:
    (a) an extension for said hub assembly at the inboard end thereof,
    (b) a collar unit within said extension mounted on the shaft including, (c) an annular inflatable member having a peripheral surface engageable with the inner peripheral surface of said extension when the annular member is inflated, and (d) coacting passage means in the collar unit and annular member connectable with a source of fluid under pressure to inflate the annular member.

4. The inflatable seal structure according to claim 3 wherein:

(a) the inner peripheral surface of the hub extension is formed of a plastic material, and (b) said annular member is formed of a rubber material.

5. The inflatable seal structure according to claim 3 wherein:

(a) a dust seal of a ring shape mounted about the collar unit with the outer peripheral surface thereof frictionally engageable with the inner peripheral surface of the hub extension outwardly from the annular member.

6. An inflatable seal structure for the inboard end of a wheel hub assembly which is rotatably supported on a shaft by a bearing located within the hub assembly and wherein the inner peripheral surface of the hub assembly at the inboard end thereof is in a concentrically spaced relation with the shaft, said seal structure comprising:

(a) a collar unit mounted on said shaft within the inboard end of the hub assembly with the outer peripheral surface of the collar unit in a concentrically spaced relation with the inner peripheral surface of the inboard end of the hub assembly, and (b) an inflatable member extended about the outer periphery of said collar unit, (c) said inflatable member on inflation thereof being movable into frictional fluid sealing engagement with said inner peripheral surface of the hub assembly.

7. The invention according to claim 6 wherein:

(a) the inner peripheral surface of the inboard end of the hub assembly is formed of a plastic material, and (b) said inflatable member is formed of a rubber material.

8. An inflatable seal structure for the inboard end of a wheel hub assembly which is rotatably supported on a shaft by a bearing located within the hub assembly and wherein the inner peripheral surface of the hub assembly at the inboard end thereof is in a concentrically spaced relation with the shaft and wherein the outboard end thereof is fluid sealed by a cap unit, said seal structure comprising:

(a) a collar unit mounted on said shaft within the inboard end of the hub assembly with the outer peripheral surface of the collar unit in a concentrically spaced relation with the inner peripheral surface of the inboard end of the hub assembly, (b) an inflatable member extended about the outer periphery of said collar unit having an expandable fluid chamber means, (c) said inflatable member on expansion of said chamber means being movable into frictional fluid sealing engagement with said inner peripheral surface of the hub assembly whereby to form a wheel hub chamber defined by said hub assembly, cap unit and collar unit, and (d) fluid bleed passage means for fluid connecting said chamber means with said wheel hub chamber.

References Cited

UNITED STATES PATENTS

| 3,003,834 | 10/1961 | Pendleton | 308—187.1 |
| 3,089,738 | 5/1963 | Steiner | 301—108 |
| 3,144,280 | 8/1964 | Sorenson | 308—36.1 |
| 3,169,809 | 2/1965 | Pendleton | 308—187.1 |

FOREIGN PATENTS 647,650 12/1950 Great Britain.

SAMUEL ROTHBERG, *Primary Examiner.*